United States Patent
Hendriksen et al.

(10) Patent No.: US 8,460,432 B2
(45) Date of Patent: Jun. 11, 2013

(54) CHEAP THIN FILM OXYGEN MEMBRANES

(75) Inventors: Peter Vang Hendriksen, Hilleroed (DK); Mogens Mogensen, Lynge (DK); Wei Guo Wang, Ningbo (CN); Bjarke Thomas Dalslet, Copenhagen NV (DK)

(73) Assignee: Technical University of Denmark, Kgs. Lyngby (DK)

( * ) Notice: Subject to any disclaimer, the term of this patent is extended or adjusted under 35 U.S.C. 154(b) by 334 days.

(21) Appl. No.: 12/674,947

(22) PCT Filed: Aug. 29, 2008

(86) PCT No.: PCT/EP2008/007098
§ 371 (c)(1),
(2), (4) Date: Feb. 17, 2011

(87) PCT Pub. No.: WO2009/027101
PCT Pub. Date: Mar. 5, 2009

(65) Prior Publication Data
US 2011/0132772 A1    Jun. 9, 2011

(30) Foreign Application Priority Data
Aug. 31, 2007   (EP) .................................. 07017098

(51) Int. Cl.
*B01D 53/22*   (2006.01)
*B01D 71/02*   (2006.01)
*C25B 13/04*   (2006.01)

(52) U.S. Cl.
USPC ............... 95/54; 96/11; 204/295; 502/101; 205/763

(58) Field of Classification Search
USPC .............. 96/4, 11; 95/45, 54; 423/418.2, 650; 204/295; 502/4, 101; 205/763
See application file for complete search history.

(56) References Cited

U.S. PATENT DOCUMENTS

| | | | | |
|---|---|---|---|---|
| 6,165,553 | A * | 12/2000 | Chen et al. | 427/240 |
| 6,541,159 | B1 | 4/2003 | Li et al. | |
| 6,638,575 | B1 | 10/2003 | Chen et al. | 427/453 |
| 7,229,537 | B2 * | 6/2007 | Chen et al. | 95/54 |
| 7,279,027 | B2 * | 10/2007 | Carolan et al. | 96/11 |
| 2005/0142053 | A1 | 6/2005 | Takamura et al. | |
| 2011/0020192 | A1 * | 1/2011 | Baumann et al. | 96/11 |
| 2011/0176980 | A1 * | 7/2011 | Larsen et al. | 502/2 |

FOREIGN PATENT DOCUMENTS

| | | |
|---|---|---|
| CN | 1251318 A | 4/2000 |
| CN | 1280521 A | 1/2001 |

* cited by examiner

*Primary Examiner* — Jason M Greene
(74) *Attorney, Agent, or Firm* — Seed IP Law Group PLLC

(57) ABSTRACT

The present invention provides a membrane, comprising a porous support layer a gas tight electronically and ionically conducting membrane layer and a catalyst layer, characterized in that the electronically and ionically conducting membrane layer is formed from a material having a crystallite structure with a crystal size of about 1 to 100 nm, and a method for producing same.

15 Claims, 1 Drawing Sheet

CHEAP THIN FILM OXYGEN MEMBRANES

FIELD OF THE INVENTION

The present invention provides a cheap and robust membrane structure comprising a layer being formed from a material having a crystallinity in the nano-range, and a cost effective architecture and method for producing same. The membrane is especially suitable as a gas separation membrane.

BACKGROUND

Generally, separation membranes are made from various inorganic or organic materials, including ceramics, metals and polymers. For example, ceramic materials possessing oxide ion conductivity are suitable to cause selective permeation of oxygen at high temperatures, such as temperatures of about 500° C. or more. Membranes comprising at least a layer of said ceramic materials are therefore suitable to separate oxygen from oxygen containing gas mixtures.

More specifically, it has been suggested to apply electrodes to both sides of a ceramic membrane structure being based on electrolytic material and to connect said electrodes externally. On one side of the membrane, the oxygen partial pressure is during use lower than on the other side of the membrane. In said configuration, oxygen molecules at the side with the higher oxygen partial pressure accept electrons, split and become oxygen ions, which diffuse through the membrane to the opposite electrode, where they discharge, and leave the membrane, either as oxygen molecules or, in the case of a combustible gas being present, as part of a combustion product. The electrons are transferred back via the external circuit to the first electrode. As a result, oxygen is continuously separated from the gas at the side of the membrane which has the higher oxygen partial pressure.

The above described membranes are also suitable for partial oxidation processes, for instance oxidation of methane gas in order to produce syngas, i.e. a mixture of CO and $H_2$. Syngas is an important intermediate product in the production of methanol, ammonia, or synthetic diesel.

Some oxygen ion conductors also exhibit electron conductivity, referred to as electron—oxide ion mixed conductors, or just mixed conductors. If the electronic conductivity is not sufficiently high, dual conducting mixtures may be prepared by mixing an ion-conducting material with an electronically conducting material to form a composite, multi-component, non-single phase material.

Additionally, membranes can be used to separate hydrogen. In this case, the membrane material must be a proton conductor. Hydrogen can serve as a clean fuel for powering many devices ranging from large turbine engines in integrated gasification combined cycle electric power plants, to small fuel cells. Hydrogen can also power automobiles, and large quantities are used in petroleum refining.

In case of syngas production, the above described ceramic membranes are exposed to extreme conditions. The opposite sides of the membrane are simultaneously exposed to a highly oxidizing and a highly reducing atmosphere, respectively, at high temperatures. Also the thermal and chemical expansion of the membrane at high temperatures (and low $pO_2$) might result in stress in the membrane and in the other parts of the apparatus containing said membrane. The membranes therefore need chemical stability with respect to decomposition and should further exhibit low expansion on reduction.

Oxygen separation membranes may also be operated at high $pO_2$ where the driving force for the flux of oxygen is created by having a high absolute pressure difference over the membrane. In this case, the chemically environment is more benign, but the mechanical loads introduced by the pressure differences are severe and a structurally robust membrane design is necessary.

The following Table lists some of the proposed materials for oxygen separation together with some of their properties.

TABLE 1

Oxide ion conductivity and $p_{O2}$ stability limits of membrane candidate materials

| | $\sigma_O$ (S/m) (1073 K) | $\sigma_O$ (S/m) (1273 K) | estimated decompositon $p_{O2}$ (atm) |
|---|---|---|---|
| $La_{0.6}Sr_{0.4}FeO_{3-\delta}$ | 1 [1] | 20 [1] | $10^{-17}$ (1273 K) $10^{-14}$ (1473 K) |
| $La_{0.6}Sr_{0.4}Co_{0.2}Fe_{0.8}O_{3-\delta}$ | 4 [3] | 20 [3] | $10^{-7}$ (1273 K) |
| $La_{0.6}Sr_{0.4}CoO_{3-\delta}$ | 6 [4] | 40 [4] | $10^{-7}$ (1273 K) |
| $Ba_{0.5}Sr_{0.5}FeO_{3-\delta}$ | >4 [5] | >8 [5] | $10^{-17}$ (1273 K) |
| $Ba_{0.5}Sr_{0.5}Co_{0.8}Fe_{0.2}O_{3-\delta}$ | >27 [5] | >47 [5] | $10^{-7}$ (1273 K) |
| $Ce_{0.9}Gd_{0.1}O_{1.95-\delta}$ | 6 [6] | 16 [6] | — |
| $Ce_{0.8}Gd_{0.2}O_{1.9-\delta}$ | 6 [6], 20 [7] | 16 [6], 25 [7] | — |
| $Y_{0.16}Zr_{0.84}O_{1.92}$ | | 10 | — |

References in Table 1:
[1] M. Søgaard, P. V. Hendriksen, M. Mogensen, "Oxygen nonstoichiometry and transport properties of strontium substituted lanthanum ferrite", J. Solid State Chem 180 (2007) 1489-1503.
[2] T. Nakamura, G. Petzow, L. J. Gauckler, "Stability of the perovskite phase $LaBO_3$ (B = V, Cr, Mn, Fe, Co, Ni) in a reducing atmosphere i. experimental results", Materials Research Bulletin 14 (1979) 649-659.
[3] B. Dalslet, M. Søgaard, P. V. Hendriksen, "Determination of oxygen transport properties from flux and driving force measurements using an oxygen pump and an electrolyte probe", J. Electrochem. Soc., to be published.
[4] M. Søgaard, P. V. Hendriksen, M. Mogensen, F. W. Poulsen, E. Skou, "Oxygen nonstoichiometry and transport properties of strontium substituted lanthanum cobaltite", Solid State Ionics 177 (2006) 3285-3296.
[5] Z. Chen, R. Ran, W. Zhou, Z. Shao, S. Liu, "Assessment of $Ba_{0.5}Sr_{0.5}Co_{1-y}Fe_yO_{3-\delta}$ (y = 0.0-1.0) for prospective application as cathode for it-SOFCs or oxygen permeating membrane", Electrochimica Acta 52 (2007) 7343-7351.
[6] S. Wang, H. Inaba, H. Tagawa, M. Dokiya, T. Hashimoto, "Nonstoichiometry of $Ce_{0.9}Gd_{0.1}O_{1.95-x}$", Solid State Ionics 107 (1998) 73-79.
[7] N. Sammes, Z. Cai, "Ionic conductivity of ceria/yttria stabilized zirconia electrolyte materials", Solid State Ionics 100 (1997) 39-44.

Especially flourite and perovskite structured metal oxide materials offer a number of candidates for good oxygen separation membranes. Table 1 lists the oxygen ion conductivity, $\sigma_o$ of these materials as well as the $pO_2$ of decomposition at various temperatures (the $pO_2$ of decomposition is estimated as the $pO_2$ of decomposition of $LaCoO_3$ for the Co containing perovskites, and the $pO_2$ of decomposition of $LaFeO_3$ for the Fe containing perovskites). The other listed materials in Table 1 are stable in the $pO_2$ range required for operating a syngas membrane.

As is evident from the Table, the Co-containing perovskites exhibit a high ionic conductivity. However, they do not possess sufficient thermodynamic stability for operating at low $pO_2$, as is required for instance for production of synthesis gas in a membrane reactor.

On the other hand, of the materials possessing sufficient thermodynamic stability as required for syngas production, doped ceria possesses the highest ionic conductivity as compared to the above perovskite candidates.

The performance of a mixed conducting membrane will in general be limited by either the electronic or the ionic conductivity, whichever is lower. For the perovskite materials, the ionic conductivity is generally the limiting factor, whereas the electronic conductivity is the limiting factor for the fluorite materials. At high $pO_2$ the performance of $Ce_{0.9}Gd_{0.1}O_{1.95-\delta}$ and $Ce_{0.8}Gd_{0.2}O_{1.9-\delta}$ will be limited by their electronic conductivity. It has been suggested to enhance the electronic conductivity by using Pr substitution rather than Gd substitution. However, in order to improve the performance of the membrane, for example for the syngas production, new materials are desired exhibiting a better balance of ionic and electronic conductivity to overcome the current limits as provided by the prior art.

U.S. Pat. No. 6,139,810 discloses a reactor comprising reaction tubes which comprise an oxygen selective ion transport membrane with an anode side, wherein said membrane is formed from a mixed conductor metal oxide, a heat transfer means formed from metal, and a reforming catalyst disposed about said anode side of said oxygen selective ion transport membrane.

WO-A1-01/09968 relates to mechanically strong, highly electronically conductive porous substrates for solid-state electrochemical devices. A gas separation device is disclosed comprising a first electrode comprising a metal and a second electrode comprising a ceramic material.

U.S. Pat. No. 6,033,632 relates to solid state gas-impermeable, ceramic membranes useful for promotion of oxidation-reduction reactions as well as for oxygen gas separation. The membranes are fabricated from a single-component material which exhibits both, electron conductivity and oxygen-ion conductivity. Said material has a brownmillerite structure with the general formula $A_2B_2O_5$.

EP-A-0 766 330 discloses a solid multi-component membrane which comprises intimate, gas-impervious, multiphase mixtures of an electronically-conductive phase and/or gas-impervious "single phase" mixed metal oxides having a perowskite structure and having both electron-conductive and oxygen ion-conductive properties.

U.S. Pat. No. 6,165,553 discloses a method of fabricating a dense ceramic membrane comprising:
providing a colloidal suspension of a ceramic powder;
providing a polymeric precursor comprising a polymer containing metal cations;
mixing the polymeric precursor together with the colloidal suspension;
applying the mixture to a membrane support to form a composite structure; and
heating the composite structure to form a dense membrane on the membrane support.

US-A-2005/0142053 relates to a composite-type mixed oxygen ion and electronic conductor, characterized in that its oxygen ion conductive phase consists of gadoliniumdoped cerium oxide, and its electronic conductive phase consists of a spinel-type ferrite.

U.S. Pat. No. 6,541,159 discloses an oxygen separating membrane, comprising a backbone having a first surface and a second surface and an array of interconnected pores extending therebetween; a hydroxide ion conductor extending through said pores from said first surface to said second surface; and an electrical conductor extending through said pores from said first surface to said second surface, said electrical conductor being discrete from said ion conductor.

However, the membrane structures suggested in the prior art are insufficient in chemical and mechanical stability and reliability and/or do not provide the required high performance, and are further expensive in production, thus preventing mass production. The suggested membranes do not result in membranes having a good balance of ionic and electronic conductivity, limiting the membrane efficiency due to the inherent limit of either the electrical or ionic conductivity of the employed materials. On the other hand, the suggested materials showing a promising balance are chemically unstable structures or otherwise not suitable for membrane mass production, as the membranes have a very short life time or they are expensive to manufacture.

OBJECT OF THE INVENTION

In view of the difficulties connected with the membranes of the prior art as outlined above, it was the object of the present invention to provide a cheap, mechanically robust membrane having excellent ion and electron conductivity, and a cost effective method for producing same.

SUMMARY OF THE INVENTION

This object is achieved by the present invention providing a high performance membrane having an architecture with a thin membrane layer on a support structure and the membrane layer being nanocrystalline. The membrane exhibits robustness and is manufactured with a low price of the final device.

More specifically, the above object is achieved by a membrane, comprising a porous support layer, a gas tight electronically and ionically conducting membrane layer and one or two catalyst layers, characterized in that the electronically and ionically conducting membrane layer is formed from a material having a crystallite structure with a crystal size of about 1 to 100 nm.

The above object is further achieved by a method of producing the above membrane, comprising the steps of:
providing a support layer;
optionally providing a catalyst layer or a catalyst precursor layer on the support layer;
applying an electronically and ionically conducting membrane layer on the support layer or the optional catalyst layer;
applying a catalyst layer on the electronically and ionically conducting layer; and
sintering the multilayer structure.

Preferred embodiments are set forth in the subclaims and the detailed description of the invention below.

DESCRIPTION OF THE INVENTION

The present invention provides a membrane, comprising a porous support layer, a gas tight electronically and ionically conducting membrane layer and one or two catalyst layers, characterized in that the electronically and ionically conducting membrane layer is formed from a material having a crystallite structure with a crystal size of about 1 to 100 nm.

Advantageously, the membrane of the present invention can be manufactured from cheap materials as the production process allows a vast variety of suitable compounds without limitation to some expensive materials at the same time. The present invention further comprises a support layer providing excellent mechanical stability while the membrane structure has a gas tight electronically and ionically conducting layer exhibiting a good balance of ion and electron conductivity.

Figure 1:
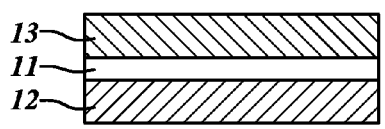
FIG. 1 illustrates a membrane structure in accordance with the present invention.
Figure 2:
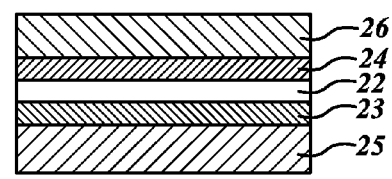
FIG. 2 illustrates another membrane structure in accordance with the present invention, comprising catalyst support layers.
Figure 3:
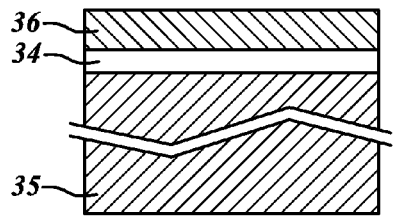
FIG. 3 illustrates another membrane structure in accordance with the present invention, comprising a combined support and catalyst layer.
Figure 4:
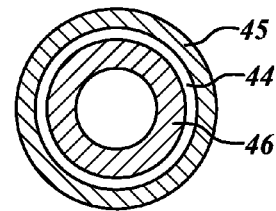
FIG. 4 illustrates another membrane structure in accordance with the present invention, the membrane having a tubular design.

In FIG. 1, the principle structure of the membrane of the present invention is illustrated. The gas tight electronically and ionically conducting layer 11 is sandwiched between the support layer 12 and the catalyst layer 13. The membrane of FIG. 1 is shown as a symmetrical flat plate design. In FIG. 4, a tubular design as an alternative is illustrated, with the gas tight electronically and ionically conducting layer 44 being sandwiched between the catalyst layer 45 and the support layer 46. The membrane may of course have other designs than a flat plate or tubular design, depending on the desired application. Additional layers may also be present, such as (a) bonding layer(s) 23, 24, or catalyst "layers" either on the surface of the support structure (lower surface of 35) (b) in the support or (c) as a separate layer between the support layer and the gas tight layer (23).

Preferably, the support layer comprises a metal. More preferred is the support layer being a metallic support layer. Metallic support layers can be obtained from cheap starting materials which, at the same time, provide excellent mechanical stability as compared to brittle ceramic supports. The metallic support layer also has a good electronic conductivity and can serve as a catalyst layer. Consequently, the process can be simplified which results in the membrane being more cost effective.

The metal support further allows relaxation of stresses building up in the structure due to changes in specific volume of the membrane material under use, making the membrane structure mechanically more robust.

The metal support layer is a porous metal layer. The porosity is preferably in the range of 20 to 70%, more preferably from 30 to 60%, and most preferably from 35 to 55%. The pore size is preferably in the range of 0.5 to 10 μm, more preferably from 1 to 6 μm and most preferred from 2 to 5 μm.

The material for the metal support layer is preferably selected from the group of stainless steel, $Fe_{1-x-y}Cr_xMa_y$ alloys, wherein Ma is Ni, Ti, Ce, Mn, Mo, W, Co, La, Y, or Al, and or NiO+metal oxides such as $TiO_2$ or $Cr_2O_3$. In the formula, x is from 0 to 1, preferably from 0.1 to 0.9, and more preferably from 0.2 to 0.8. Y is from 0 to 1, preferably from 0.1 to 0.9, and more preferably from 0.2 to 0.8. Furthermore, $X+Y \leq 1$. Most preferred is the metal support being stainless steel or an Fe—Cr alloy containing up to 5% Al (by weight).

Also preferred is the metal support layer being a presintered support layer. Such support layers are either commercially available products, or can be manufactured separately prior to assembly of the membrane structure. The degree of pre-sintering can be tailored to allow further shrinkage during sintering of the device, or to allow no further shrinking during the sintering of the membrane, as desired.

Further preferred is the support layer being a thin support layer. The thickness of the support layer is generally in the range of from 100 to 2000 μm, with 200 to 1000 μm being more preferred.

The electronically and ionically conducting layer is an oxygen ion conductor or proton conductor, depending on the desired application. Suitable materials having oxygen ion conducting properties include doped ceria ($Ce_{1-x}M_xO_{2-\delta}$, where M=Ca, Sm, Gd, Sc, Ga, Y and/or any Ln (lanthanide) element, or combinations thereof), wherein x is from 0 to 1, preferably from 0.1 to 0.9, and more preferably from 0.2 to 0.8; and doped zirconia $Zr_{1-x}M_xO_{2-\delta}$, where M=Sc, Y, Ce, Ga or combinations thereof, and wherein x is from 0 to 1, preferably from 0.1 to 0.9, and more preferably from 0.2 to 0.8. Most preferred is doped ceria.

Suitable materials having proton conducting properties include perovskites with the general formula $ABO_3$, where A=Ca, Sr, Ba; B=Ce, Zr, Ti, Sn. Other suitable materials are e.g. $Ba_2YSnO_{6.6}$, $Sr_2(ScNb)O_6$, $LnZr_2O_2$, $LaPO_4$ and $Ba_3B'B''O_9$ (B'=Ca, Sr; B''=Nb, Ta).

The gas tight electronically and ionically conducting layer is furthermore formed from a material having a crystallite structure with a crystal size of about 1 to 200 nm, preferably having a crystallite structure with a crystal size of about 3 to 80 nm, even more preferably having a crystallite structure with a crystal size of about 5 to 50 nm. The nanocrystallinity in the layer leads to enhanced electronic conductivity (and in some cases also ionic conductivity).

If the enhanced transport properties obtained via the nanocrystallinity in the film are not sufficient for the specific intended use, the material can be mixed with small amounts, preferably less than 20%, of an electronically conducting material. Preferred are metals. In view of improved adhesion of the layers so as to provide better stability of the membrane structure, it is more preferred to mix one of the above listed ionically conductive materials with the metal employed as the metallic support. Most preferred is a mixture of doped ceria and an iron based alloy. Mixing electronically conductive and ionically conductive materials furthermore advantageously results in increasing the effective electron conductivity either by affecting the grain boundaries of the layer through a direct action as "charge carriers", or by facilitating the reduction of ceria in the membrane.

The membrane in the above structure may, depending on the magnitude of the electronic conductivity, exhibit an electromotive force different from zero during operation in an oxygen potential gradient. This feature can for example be used as a control measure during reactor operation. If the reactor is equipped with an external electrical circuit, it is possible to precisely increase or decrease the flux through the membrane by measuring the electromotive force and adjusting by an external potentiostat to provide the desired flux through the membrane.

In another preferred embodiment, the catalyst layers comprise catalyst material.

In case the catalyst layer is intended to form the later oxygen reduction catalyst, preferred materials for forming said catalyst layer comprise one or more materials selected from the group of $(Ma_{1-x}Mb_x)(Mc_{1-y}Md_y)O_{3-\delta}$, doped ceria or doped zirconia, or mixtures thereof. Ma=lanthanides (Ln) or Y, preferably La. Mb=earth alkali elements, preferably Sr. Mc and Md are one or more elements chosen from the group of transition metals, preferably one or more of the type Mn, Fe, Co. In the formula, x is from 0 to 1, preferably from 0.1 to 0.9, and more preferably from 0.2 to 0.8. Y is from 0 to 1, preferably from 0.2 to 0.8, and more preferably from 0.4 to 0.6.

In case the catalyst layer is intended to form the later oxidation catalyst layer, more preferred materials for forming said catalyst layer comprise a material selected from the group of Ni, Ni—Fe alloy, Ru, Pt, doped ceria, or doped zirconia, or mixtures thereof. The dopants are the same as mentioned earlier. Alternatively $Ma_sTi_{1-x}Mb_xO_{3-\delta}$, Ma=Ba, Sr, Ca; Mb=V, Nb, Ta, Mo, W, Th, U; $0.90 \leq s \leq 1.05$; or $LnCr_{1-x}M_xO_{3-\delta}$, M=Ti, V, Mn, Nb, Mo, W, Th, U may be used as oxidation catalyst materials. In the formula, x is from 0 to 1, preferably from 0.1 to 0.9, and more preferably from 0.2 to 0.8. Y is from 0 to 1, preferably from 0.1 to 0.9, and more preferably from 0.2 to 0.8.

Further preferred is the support comprising catalyst material. Suitable catalyst materials correspond to the ones above mentioned in connection with the catalyst layer.

For the specific case of an oxygen separation membrane operating at relatively high pO$_2$ on both surfaces, preferred materials for the oxidation catalyst are the same as listed in the previous paragraph as preferred for the reduction catalyst.

The oxidation catalyst material in the sense of the present invention may preferably be a material for oxidizing oxide ions to oxygen, carbon to carbon monoxide and/or carbon dioxide, or, alternatively, a mixture of methane and water to a mixture of carbon monoxide (and/or carbon dioxide), and hydrogen (syngas).

The reduction catalyst material in the sense of the present invention is a material reducing oxygen to oxide ions.

In another preferred embodiment, the catalyst material or catalyst precursor material may be applied on the surface of the support layer, for example by spray painting the catalyst material thereon. Depending on the application, the catalytic activity may be sufficient even if the catalyst material is only provided on the surface of the support layer.

In a further preferred embodiment, an additional bonding layer may be located between the gas tight electronically and ionically conducting layer and one or each of the adjacent layers. The bonding layers comprise ionically conductive and electronically conductive material, preferably the materials used for the respective layers adjacent to the bonding layers, so as to provide an improved adhesion of the layers. As the TEC of the bonding layers lie between those of the two adjacent layers, the mechanical strength of the whole structure is improved while providing better adhesion of the respective layers. If a bonding layer is present, said bonding layer will function as the catalyst layer as it is located next to the electronically and ionically conducting layer. The bonding layer thus comprises catalytic material.

Generally, the optional catalyst layer will be applied if the performance of the cell requires a layer comprising catalyst material close to the membrane layer. Applying the optional layer ensures the close contact between the optional catalyst layer and the membrane layer. As outlined above, depending on the desired application, the catalytic activity may be sufficient even if the catalyst material is only provided on the surface of the support layer. The optional catalyst layer is thus not generally needed.

The membrane structure can generally have any desired shape. However, flat and tubular designs are preferred for easier application of the respective layers on each other.

The present invention further provides a method of producing the above membrane, comprising the steps of:
  providing a support layer;
  optionally providing a catalyst layer or a catalyst precursor layer on the support layer;
  applying an electronically and ionically conducting layer on the support layer or optional catalyst layer;
  applying a catalyst layer on the electronically and ionically conducting layer; and
  sintering the multilayer structure.

A two step sintering may be needed, with a sintering step after application of the ionically and electronic conducting layer and another sintering step after application of the catalyst layer(s).

After the sintering step, the electronically and ionically conducting layer will be a gas tight layer.

Since cheap materials can be employed, and since the method is simple and does not require much labour, a cost effective production of the membrane structure can be ensured, enabling mass production of an inexpensive high performance component for industrial processes.

Preferably, the method further comprises the step of applying a catalyst or catalyst precursor to the catalyst layers.

Depending on the catalyst material, the additional catalyst provides a better performance. Said catalyst may be impregnated as a catalyst or catalyst precursor during the manufacture, or introduced into the structure prior to sintering if impregnation is not employed. In case a catalyst precursor is used, said precursor is converted into the final catalyst after a heat treatment. Preferred for impregnation are solutions of the respective catalyst nitrate salts, and suspensions.

The layers may be, for example, formed by tape casting. If a tubular design is desired, extrusion processes may be employed, as is known to a person skilled in the art. The additional layers may be separately tape cast, followed by lamination of the layers. Alternatively, screen printing, spray painting or dip coating methods may be used for the formation of the respective layers.

The membrane structure is preferably manufactured by applying the gas tight electronically and ionically conducting layer on the support layer being either a pre-sintered support layer or a layer in green state to be co-sintered with the membrane. The catalyst layer and the electronically and ionically conducting layer may be applied by any technique known in the art. Preferably, lamination of separately produced layers or extrusion for the case of co-sintering and for the case of a pre-sintered support chemical vapor deposition (CVD), pulsed laser deposition (PLD), spray pyrolysis or vacuum plasma spraying is used.

The sintering of the obtained multilayer structure is preferably performed under reducing conditions. The temperatures are preferably in the range of 700° C. to 1400° C., more preferably from 800° C. to 1350° C. Prior to the sintering at said temperatures, any organic material is removed, for example burned or decomposed, at temperatures in the range of from 300° C. to 700° C. Said removal is usually carried out under oxidizing conditions.

The catalyst layer between the support and the gas tight layer, and, if desired, the support layer, is preferably impregnated, more preferably vacuum impregnated with a solution or suspension of the catalyst or catalyst precursor. If the electrode layer or support layer is a porous layer, alternatively electrophoretic deposition (EPD) may be employed to apply the catalyst or catalyst precursor.

The catalyst layer on the non-support side of the gas tight layer (13, 26, 36) is prepared by any conventional ceramic processing technique like screen printing, air spraying or dip coating.

In another preferred embodiment, the method of the present invention is carted out without employing any polymeric precursor at all. The use a polymeric precursor is for example disclosed in U.S. Pat. No. 5,494,700, wherein metal ions together a polymeric precursor, which may for example be a polymerizable organic solvent, are used to form films on a support, followed by drying and calcining. However, in the method of the present invention, preferably the application of the optional catalyst layer or catalyst precursor layer on the support layer; the application of the electronically and ionically conducting layer on the support layer or optional catalyst layer; and the application of the catalyst layer on the electronically and ionically conducting layer are all carted out without using a polymeric precursor.

All preferred embodiments and materials described above for the membrane of course also ally to the method of the present invention.

The membrane of the present invention is especially suitable for oxygen separation and for supplying oxygen to a partial oxidation process of a hydrocarbon fuel to syngas in a membrane reactor.

The present invention will now be described in more detail with reference to the following examples. The invention is however not intended to be limited thereto.

EXAMPLES

Example 1

Different membranes for syngas production were manufactured by a conventional ceramic processing route, as described in detail in WO 2005/122300.

The first step was the manufacture of several separate tapes to be laminated to form the membrane structure. The support tapes were manufactured from suspensions comprising of FSS Fe, 20% Cr for tape-casting by means of ball milling of powders with polyvinyl pyrrolidone (PVP), polyvinyl butyral (PVB) and EtOH+MEK as additives. After control of particle size, the suspensions were tape-cast using a double doctor blade system and the tapes were subsequently dried. The thickness of the support tapes was adjusted to be between 200 and 2000 µm.

The second step was the provision of a catalyst precursor layer for later impregnation with a suitable catalyst. The impregnation layer was made from mixtures of CG10 (doped ceria) and FSS prepared by tape casting and laminated with one of the above support tapes by rolling. The impregnation layer tapes were tailored such that the pore size in the upper layer was less or about 1 µm. The total layer thickness was ~30 µm and the porosity was about 30%.

The third step was the lamination with a membrane tape based on nanosized CG10 having an average particle size of 45 nm. The tape thickness was about 20 µm to achieve a sintered thickness of around 10 µm.

The sintering shrinkages of the various supports were tailored by control of solid loading, particle size distributions and addition of poreformers such that they result in a dense membrane layer after sintering.

Components were cut out of the laminate in a desired size.

The next step was sintering of the structures at 1200° C. in a hydrogen/argon gas mixture.

After sintering and cooling, a steam reforming/cracking catalyst was impregnated into the porous layers by vacuum infiltration with Ni or Ru-nitrate solutions.

After cleaning, an oxygen reduction catalyst, $La_{0.6}Sr_{0.3}Ba_{0.1}Co_{0.8}Fe_{0.2}O_3$, was applied on the exposed surface of the membrane. The catalyst layer was applied by screen printing. The ink for printing was prepared by ball milling suitable powder suspensions with binders and dispersing agents in terpineol.

Finally, the component was sintered at 980° C. to obtain the finished membrane structures ready to be build into a reactor.

Example 2

A membrane structure was obtained as described in Example 1 with the difference that the oxygen reduction catalyst layer and the membrane layer were applied by spraying.

The membrane structures were finalized as described in Example 1 and was ready to be build in a reactor.

Example 3

A porous metal component manufactured by a conventional sinter-metal route of desired size was used as a pre-sintered support layer. The support was formed from Fe20Cr1Al.

Afterwards, a catalyst layer of CG10/$La_{0.6}Sr_{0.4}Cr_{0.5}Mn_{0.5}O_3$ was applied by screen printing a suspension (terpineol based) containing CG10 and 10% of starch as a pore former. The layer thickness was about 15 µm.

A second layer of CG10 was printed on top of the first CG10 layer, whereby a nanosized powder with an average particle size of about 5 to 20 nm containing 1 wt % CoO was used. The cobalt oxide was added as described by Eva Sierra ETH, diss. 15971. The ceria powder was ultrasonically dispersed in ethanol, followed by addition of cobalt nitrate hexahydrate dissolved in ethanol. After ultrasonic treatment, the solvent was evaporated and the powder dried and calcined at 400° C.

After application of the second layer, the trilayer structure was fired at 950° C. for 24 hours in air to achieve full density of the membrane layer.

Subsequently an oxygen reduction catalyst was applied on the side of the CG10 membrane layer as described in Example 1.

Example 4

The first step was the manufacture of a support layer from a Fe80Cr20 suspension for tape-casting by means of ball milling of powders with polyvinyl pyrrolidone (PVP), polyvinyl butyral (PVB) and EtOH+MEK as additives. After control of particle size, the suspension was tape-cast using a double doctor blade system and the tape was subsequently dried. The thickness of the support tape was 300 µm.

The second step was the provision of an impregnation layer for later impregnation with a suitable catalyst. The impregnation layer was made from CGO and Fe8020Cr and a pore former prepared by tape casting and laminated with one of the above support tapes by rolling. The impregnation layer tape was tailored such that the porosity was around 30% in the final layer, and the average pore size was around 2 µm.

In the third step, the two tapes were laminated by rolling.

In the fourth step, the bilayer structure was sintered at about 1200° C. for four hours in a hydrogen/argon atmosphere.

As a fifth step after sintering and cooling, a steam reforming/cracking catalyst was impregnated into the porous layers by vacuum infiltration with Ni or Ru-nitrate solutions. The infiltrations are repeated 2-5 times with intermediate heat treatments.

In the sixth step, the surface of the bilayer structure was treated for application of the subsequent gas-tight layer. The pore size was brought down to less than 0.5 µm. This was achieved by the method described by Pan "Processing of YSZ thin films on dense and porous substrates", Y. Pan a, J. H. Zhu a,*, M. Z. Hu b, E. A. Payzant, Surface & Coatings Technology 200 (2005) 1242-1247, or, alternatively, as described in U.S. Pat. No. 5,494,700. The component was impregnated with a colloidal suspension of CG10 and a polermeric CG10-precursors and heated to 300° C. The process was repeated up to 10 times to achieve the desired thickness (2-5 micrometer). Subsequently, the structure is fired at about 850° C. for 4 hours.

In the seventh step, a gas tight layer was applied by air blast spray pyrolysis, as described in J. Rupp Acta, Materialia 54 (2006) 1721.

In the 8. step, the structure was sintered for 3 hours at 800 C.

In the 9. step, an oxygen reduction catalyst layer was applied on top of the gas tight layer by screen printing as described in Example 1. The finally obtained membrane structure was ready to be used in the desired application.

Example 5

A membrane structure was obtained as described in Example 3. However, step 6 was omitted and the gas tight layer was prepared by PLD instead of SP. The finally obtained membrane structure was ready to be used in the desired application.

Example 6

Membrane structures were obtained as described in Example 1 but with either 5 vol % $Mn_3O_4$, $Fe_3O_4$ or $Co_3O_4$ added to the ceria. The finally obtained membrane structure was ready to be used in the desired application.

Example 7

A membrane structure was obtained as described in Example 3 but based on $Ce_{0.8}Pr_{0.2}O_2$ instead of CGO. Also the catalyst in the layer between support and the gas tight layer was put in place by impregnation with a La/Sr/Mn-glycine nitrate solution as a catalyst precursor. The impregnation was repeated several times, followed by heating to 500° C.

The finally obtained membrane structure was ready to be used in the desired application.

Example 8

A membrane structure was obtained as described in Example 3 but based on CG20 instead of CG10. The finally obtained membrane structure was ready to be used in the desired application.

The present invention provides a mechanically robust and cheap membrane structure, enabling mass production of an inexpensive high performance component for industrial processes.

The invention claimed is:

1. A membrane comprising a porous support layer, a gas tight electronically and ionically conducting membrane layer, and one or two catalyst layers, wherein the electronically and ionically conducting membrane layer is formed from a material having a crystallite structure with a crystal size of about 1 to 100 nm.

2. The membrane of claim 1, wherein the porous support layer is a metallic support layer.

3. The membrane of claim 1, wherein the gas tight electronically and ionically conducting membrane layer comprises doped ceria.

4. The membrane of claim 1, wherein the catalyst layers comprise a catalyst material.

5. The membrane of claim 1, wherein the porous support layer comprises a catalyst material.

6. The membrane of claim 4 or 5, wherein the catalyst material is selected from the group consisting of $(Ma_{1-x}Mb_x)(Mc_{1-y}Md_y)O_{3-\delta}$ (where Ma=lanthanides or Y; Mb=earth alkali elements; Mc and Md are one or more elements selected from the group of transition metals; x is from 0 to 1; and y is from 0 to 1), doped ceria or doped zirconia, and mixtures thereof.

7. The membrane of claim 4 or 5, wherein the catalyst material is selected from the group consisting of Ni, Ni—Fe alloy, Ru, Pt, doped ceria, doped zirconia, $Ma_sTi_{1-x}Mb_xO_{3-\delta}$ (Ma=Ba, Sr, Ca; Mb=V, Nb, Ta, Mo, W, Th, U; $0.90 \leq s \leq 1.05$; x is from 0 to 1), $LnCr_{1-x}M_xO_{3-\delta}$ (M=Ti, V, Mn, Nb, Mo, W, Th, U; and x is from 0 to 1), and mixtures thereof.

8. The membrane of claim 1, further comprising a bonding layer between the gas tight electronically and ionically conducting membrane layer and/or the one or two catalyst layers.

9. The membrane of claim 1, wherein the gas tight electronically and ionically conducting membrane layer is formed from a material having a crystallite structure with a crystal size of about 1 to 50 nm.

10. A method of producing the membrane of claim 1, comprising the steps of:
providing a support layer;
optionally applying a catalyst layer or a catalyst precursor layer on the support layer;
applying an electronically and ionically conducting layer on the support layer or optional catalyst layer;
applying a catalyst layer on the electronically and ionically conducting layer to yield a multilayer structure; and
sintering the multilayer structure.

11. The method of claim 10, further comprising the step of applying a catalyst precursor material to the catalyst precursor layer.

12. The method of claim 10, wherein the support layer is a metallic support layer.

13. The method of claim 10, wherein the support layer is a pre-sintered support layer.

14. A method for separating oxygen from an oxygen-containing mixture, comprising contacting the membrane of claim 1 with the oxygen-containing mixture.

15. A method for supplying oxygen to a partial oxidation process of a hydrocarbon fuel to syngas in a membrane reactor, comprising employing the membrane of claim 1 within the membrane reactor.

* * * * *

UNITED STATES PATENT AND TRADEMARK OFFICE
CERTIFICATE OF CORRECTION

| | | |
|---|---|---|
| PATENT NO. | : 8,460,432 B2 | Page 1 of 1 |
| APPLICATION NO. | : 12/674947 | |
| DATED | : June 11, 2013 | |
| INVENTOR(S) | : Peter Vang Hendriksen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this
Twenty-fourth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,460,432 B2  Page 1 of 1
APPLICATION NO. : 12/674947
DATED : June 11, 2013
INVENTOR(S) : Peter Vang Hendriksen et al.

It is certified that error appears in the above-identified patent and that said Letters Patent is hereby corrected as shown below:

On the Title Page

Item (75)
"Peter Vang Hendriksen, Hilleroed (DK); Mogens Mogensen, Lynge (DK); Wei Guo Wang, Ningbo (CN); Bjarke Thomas Dalslet, Copenhagen NV (DK)" should read, --Peter Vang Hendriksen, Hilleroed (DK); Mogens Mogensen, Lynge (DK); Wei Guo Wang, Ningbo City (CN); Bjarke Thomas Dalslet, Copenhagen NV (DK)--.

In the Claims

Column 12, Line 15
"(Ma=Ba, Sr, Ca; Mb=V, Nb, Ta, Mo, W, Th, U; $0.90 \leqq s \leqq 1.05$;" should read,
--(Ma=Ba, Sr, Ca; Mb=V, Nb, Ta, Mo, W, Th, U; $0.90 \leq s \leq 1.05$;--.

Signed and Sealed this
Sixteenth Day of December, 2014

Michelle K. Lee
*Deputy Director of the United States Patent and Trademark Office*